Patented Aug. 5, 1952

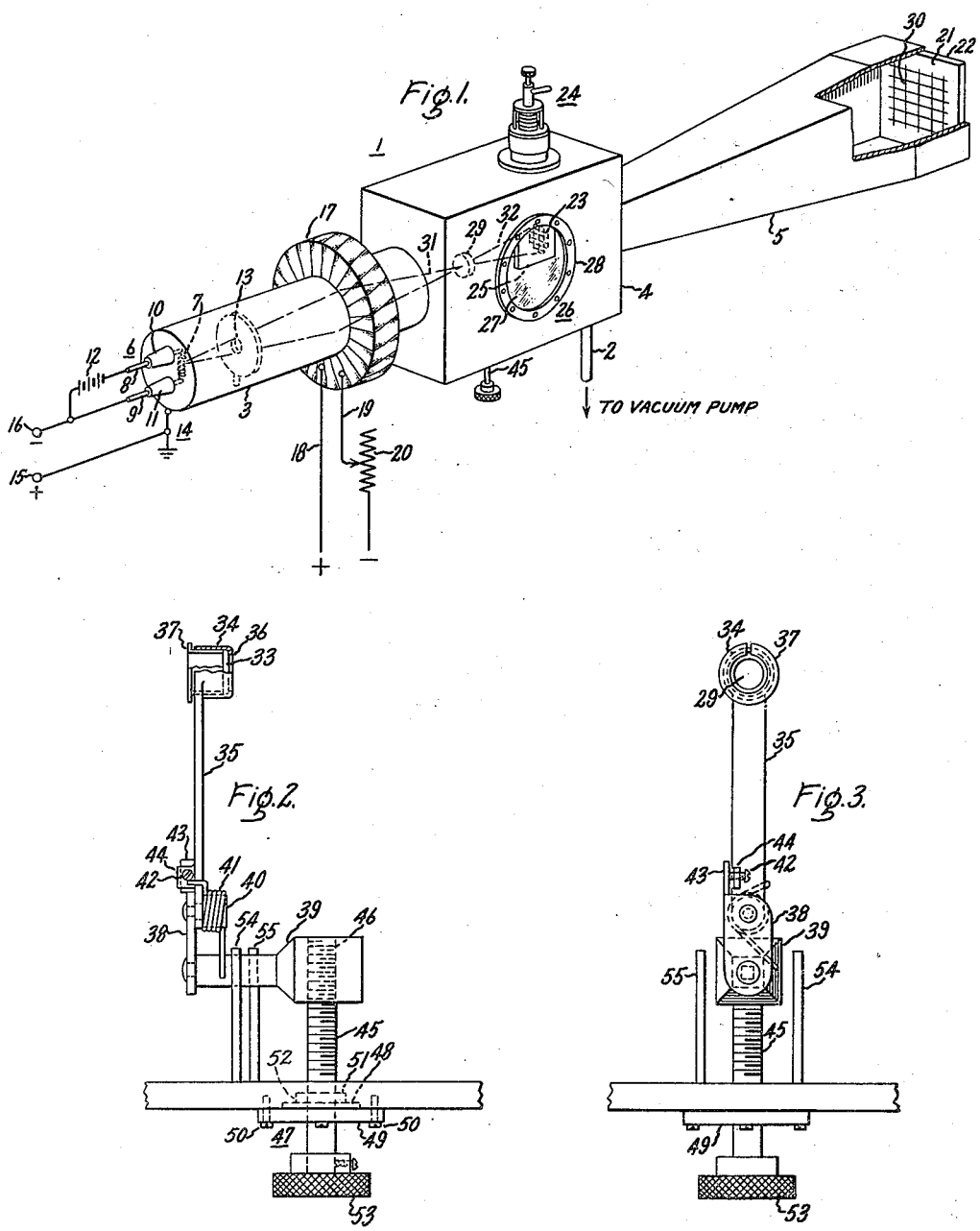

2,606,292

UNITED STATES PATENT OFFICE 2,606,292

METHOD AND APPARATUS FOR COMBINED ELECTRON MICROSCOPE AND DIFFRACTION

Maynard J. Columbe, Schenectady, N. Y., assignor to General Electric Company, a corporation of New York Application May 12, 1950, Serial No. 161,631

14 Claims. (Cl. 250—49.5)

1

This invention relates generally to electron diffraction apparatus and particularly to methods and means for converting electron diffraction apparatus for use as an electron microscope.

Methods and means for obtaining diffraction patterns are well known to the art. The apparatus involved conventionally comprises a source of electrons, means for accelerating the electrons and an electron lens or a system of electron lenses for bringing the electron beam to a focus upon an image forming means. By positioning a specimen within the electron beam between the electron lens or system of electron lenses and the image forming means a diffraction pattern of the specimen may be obtained. Such diffraction patterns comprise predetermined arrangements of concentric circles, the relative spacings of the circles being determined by electron diffraction dependent upon the lattice spacing of the atoms of the crystals of the specimen material. These patterns may be correlated with known material diffraction patterns to indicate the chemical composition of the electron irradiated specimen crystals.

Methods of and apparatus for obtaining electron shadow images or micrographs of a specimen are also well known to the art. By such means, electrons may be transmitted through or reflected from a portion of a specimen and focused by an electron lens or a system of electron lenses to provide an enlarged electron micrograph or image of the specimen portion upon an image forming means. Such an image resembles a conventional light microscope image.

The proper selection of particular portions or areas of a specimen for electron diffraction investigations has always been a major problem. Surface or crystalline structure imperfections in the portion undergoing investigation are intolerable because such imperfections cause unwanted electron deviation and deleteriously affect the characteristic diffraction pattern of a given specimen. Even though a particular portion may be pre-selected under a light microscope, it is extremely difficult to identify the preselected portion so that the specimen may be properly located within the diffraction apparatus to obtain a diffraction pattern of this same portion. The present invention solves this problem by providing methods and means for scanning a specimen to locate a portion suitable for diffraction investigations through the use of electron shadow image techniques and then obtaining a diffraction pattern of this selected portion without substantially altering the position of the specimen.

2

One aspect of the invention more fully described hereinafter comprises focusing an electron beam upon a thin electron permeable film to scatter the electrons in a divergent beam. The specimen is positioned within this divergent beam of electrons and a shadow image thereof may then be obtained upon an image forming means. By removing the specimen about within the electron beam, a suitable portion for diffraction study may be selected. Thereafter, the electron beam is focused upon the image forming means to obtain a diffraction pattern of the selected portion.

The features of the invention desired to be protected herein are pointed out with particularity in the appended claims. The invention itself together with further objects and advantages thereof may best be understood by reference to the following description taken in connection with the accompanying drawings in which Fig. 1 is a partially schematic perspective view suitably illustrating the features of the present invention and Figs. 2, 3 and 4 are detail views showing a preferred mounting for the thin electron permeable film shown schematically in Fig. 1.

Referring particularly to the perspective representation in Fig. 1, there is shown a closed envelope of a material such as brass, indicated generally by the numeral 1, which may be evacuated by means of a suitable vacuum pumping system (not shown) attached to an exhaust port 2. Envelope 1 includes an electron acceleration section 3, a specimen box 4 and an image forming section 5. A source of electrons, indicated generally by the numeral 6, may comprise a tungsten filament 7 supported within section 3 by means of leads 8 and 9 insulatingly introduced by means of insulators 10 and 11 through a wall of section 3 as indicated. Filament 7 may be heated by connecting a current source, illustrated conventionally by a battery 12 connected to leads 8 and 9. Electrons supplied by filament 7 are accelerated through an apertured anode 13 supported from section 3, which in turn is maintained at ground potential as indicated at 14. Filament 7 is maintained at a high negative potential by means of a suitable direct current high voltage supply (not shown) having its positive terminal connected to a terminal 15 and its negative terminal connected to a terminal 16.

After the electrons emerge in a beam from apertured anode 13, they may be focused with an electromagnetic lens 17 having a currentcarrying winding energized through leads 18 and 19 by a power supply (not shown). The focal length of lens 17 or the point at which it brings the electron beam to a focus may be varied by altering the current in the lens winding with a series-connected variable resistor 20. It will be realized by those skilled in the art that lens 17 may be electrostatic as well as electromagnetic or may comprise a lens system for accomplishing an equivalent purpose.

For the purpose of converting an electron image into a visible image, there is provided an image producing means 21 traversing the electron optical axis near the right-hand end of envelope 1. Image producing means 21 may consist of a suitable fluorescent screen of a well-known type. The image appearing upon the image producing means 21 may be viewed through a transparent window 22 sealed within section 5. It will be appreciated that image forming means 21 may also comprise a composite camera and fluorescent screen assembly whereby photographic replicas of the image, as well as images for visual inspection from the exterior of envelope 1, may be obtained. An assembly suitably adapted for such a purpose is disclosed in United States Patent 2,483,872, granted October 4, 1949 and assigned to the assignee of the present invention.

It will now be understood that, if a specimen, such as a thin aluminum film mounted upon polyvinyl formal and attached to a screen 23 in a manner well known to those skilled in the art, is positioned along the electron optical axis between lens 17 and image forming means 21 and the electron beam brought to a focus upon image forming means 21, diffraction rings characteristic of the atomic arrangement of the specimen will be visible upon image forming means 21. Diffraction patterns may be obtained in two well-known ways, viz, by transmission or reflection. For a transmission pattern, a very thin specimen, e. g., 500 angstroms or less in thickness, is prepared and positioned transversely of the electron beam whereby the electrons will be diffracted and diffused by the atoms within the specimen. For reflection patterns, the specimen is positioned within the beam so that the beam just grazes the surface to be examined. The electrons then are diffracted by the microscopic irregularities of the specimen surface. Any well-known means comprising a manipulator 24 and a specimen holder 25 may be employed for suitably supporting a specimen within specimen box 4. One such means is disclosed in United States Patent 2,440,067, granted April 20, 1948 and assigned to the assignee of the present invention. Specimens may be inserted within specimen box 4 through a port 26 which includes a transparent window 27 removably sealed to box 4 by a bolted washer 28.

As has been mentioned heretofore, it is often desirable to observe microscopically a specimen in order to select a suitable portion from which to obtain a diffraction pattern. According to the present invention, this may be done simply and effectively after the specimen has been inserted in the usual manner by positioning a thin electron permeable film 29 within the electron beam. When film 29 has been positioned to traverse the electron optical axis between lens 17 and specimen screen 23, the electron beam is brought to essentially a point focus upon film 29 by adjusting the current in the lens winding with adjustable resistor 20. Thereupon, the electron beam is scattered or diffused by film 29 and a shadow image of the specimen and specimen screen 23 is cast upon image forming means 21 as illustrated by the grid 30. The paths of the electrons with such an arrangement are indicated by the broken lines 31 and 32.

It will be understood that when it is desired to obtain a diffraction pattern of a specimen, film 29 is positioned outside or without the electron beam. In order to select a suitable portion for an electron diffraction investigation, however, film 29 is positioned to traverse the electron optical axis; the electron beam is brought to a focus thereupon; and the specimen upon screen 23 is moved about or scanned until the shadow micrograph appearing upon image forming means 21 indicates that a suitable portion for electron diffraction study has been located. Then film 29 may be moved outside the electron beam, the beam focused upon image forming means 21, and a diffraction pattern of the area obtained. It will be appreciated that the shadow micrograph or image appearing upon image forming means 21 may be dissolved into a diffraction pattern of a particular portion by gradually changing the focus from film 29 to the image forming means 21, and then removing film 29.

The magnification of the shadow image appearing upon image forming means 21 may, according to the invention, be varied by altering the distance between film 29 and specimen screen 23. As screen 23 and film 29 are moved closer together, the magnification of the specimen is increased. In this manner, it has been found possible to obtain a specimen magnification as high as 300 diameters. In practice, a magnification of 50 to 75 diameters with good resolution is usually all that is required for proper inspection of a specimen to determine a suitable portion for an electron diffraction investigation. By reducing the magnification of the specimen, e. g., increasing the distance between screen 23 and film 29, it is possible to investigate a very large portion or usually all of a given specimen at one time. If some particular small portion of a given specimen bears closer scrutiny, however, the film and specimen may be moved closer together thereby increasing the magnification. In such a manner, it has been found possible to single out 1 mesh in a 100 mesh per inch screen.

One very important advantage of the present invention resides in the certainty with which a desired specimen portion may be selected for diffraction study. If the thickness of film 29 is so selected, in conjunction with the energy of the electrons imparted thereto by the direct current source connected to terminals 15 and 16, that the electron beam is not entirely scattered, a relatively more intense pencil of electrons will be left along and adjacent the optical axis. This provides a shadow image of the specimen having a more intensely illuminated central area which serves as a positive identification of the position of the specimen with respect to the optical axis and hence facilitates the re-location of the specimen if necessary. After a specimen has been scanned and a suitable portion located for a diffraction study, the focal length of lens 17 may be gradually lengthened to dissolve the shadow image and form a diffraction pattern as mentioned hereinbefore. As the focal length of lens 17 is lengthened with film 29 still traversing the electron beam, the shadow image will remain but will gradually lose resolution. Due to lens non-linearity, however, the electron beam may not continue to traverse the selected portion of the specimen. The above-mentioned pencil of electrons makes this shift at once apparent, and the specimen position may be adjusted to retain the pencil in the proper position. Consequently, it may be assured that the desired specimen portion is utilized for a diffraction study when the electron beam is focused on image forming means 21 and film 29 moved outside the beam.

In addition to the advantages hereinbefore mentioned, another very important advantage of the present invention is that the shadow image obtained may have a very large field. This means that the micrograph need not be confined to a small portion of a given specimen but may be arranged to encompass an entire specimen as above described. Also, to obtain a shadow image, the specimen need not be placed close to the source of electrons 6 where destruction of the specimen by burning is easily possible. Furthermore, since film 29 has a substantial area, the focusing of the electron beam thereupon need not be confined to a particular point surface, thereby eliminating the necessity of extremely fine regulation of the filament, anode and lens power supplies and the attendant difficulty of proper adjustment. Moreover, it will be apparent that according to the present invention no additional lenses, object chambers, etc., are required for the additional function of securing a shadow image or micrograph of the specimen.

Referring particularly now to Figs. 2, 3 and 4, there is shown in detail a means for supporting film 29 within envelope 1. Film 29 may be a thin film of metal such as aluminum, silver, gold, etc., or a film of plastic material such as polystyrene, etc. A film very well adapted for the purposes of the present invention is one composed of a polyvinyl acetal such as polyvinyl formal. A film of the latter material may be mounted in the following manner upon a suitable washer or ring 33 of a material such as brass. A one per cent polyvinyl formal solution in ethylene dichloride is prepared and a glass slide dipped into this solution, brought out and allowed to dry. The ethylene dichloride is thus evaporated, leaving a film of the polyvinyl formal upon the surface of the glass. This film is floated off the slide onto a water surface and picked up on the washer or ring 33. The picking-up step may be performed by coating the surface of washer 33 with a suitable cement and gently bringing this cemented surface into contact with the film floating upon the water surface. If desired, film 29 may be mounted upon a wire mesh (not shown). Films of metal may be prepared in a somewhat similar manner as is well known to those skilled in the art.

Washer 33 with film 29 attached is inserted into a hollow cylindrical member 34 attached to an upright arm 35 and having an apertured end portion 36 against which washer 33 bears. Washer 33 may be secured within member 34 by means of a flanged, split collar 37 adapted to fit tightly within the bore of hollow cylindrical member 34. Arm 35 is rotatably supported, to facilitate specimen insertion and positioning, by an upright plate 38, which is attached to a support member 39 by means of a bearing 40 riveted to plate 38, as shown. Arm 35 is spring loaded with a spring 41 to hold it in a position determined by a screw 42 which is adapted to bear against an upwardly projecting extension 43 of plate 38. Screw 42 is threadably engaged to a boss 44 upon arm 35. Support member 39 is positioned within specimen box 4 by means of a threaded control rod 45 which engages at its inward threaded end a threaded hole 46 extending through support member 39. In order that control rod 45 may be operated from the exterior of envelope 1 without disturbing the vacuum therein, a vacuum seal 47 is provided. Seal 47 comprises a rubber gasket 48 positioned within a recess in specimen box 4 and compressed within such recess by an apertured plate 49 secured to specimen box 4 by means of screws 50. A boss 51 upon control rod 45 fits within a recess 52 in specimen box 4 and bears at its lower surface against basket 48 thereby assuring against vertical movement of control rod 45. A knurled knob 53 is attached to the exterior end of control 45 to facilitate the clockwise or counterclockwise turning of control rod 45.

It will now be realized that the above-described assembly provides a simple and convenient attachment to conventional electron diffraction apparatus for the purpose of obtaining shadow images or micrographs of a specimen in addition to diffraction patterns. Film 29 may be moved into a position to traverse the electron beam as above described by turning control knob 53 counterclockwise, assuming, of course, that there is sufficient friction between the threads upon control rod 45 and the threads of threaded hole 46. This position may be determined by an upright stud 54 attached to specimen box 4. On the other hand, film 29 may be moved to a position without the electron beam by turning control knob 53 clockwise until support member 39 bears against an upright stud 55. The vertical position of film 29 may be adjusted by continuing to turn control knob 53 after support member 39 has been brought to bear upon either stud 54 or stud 55, depending upon whether it is desired to move film 29 further up or further down.

Film 29 may conveniently have a thickness varying from 100 angstroms to 2,000 angstroms. The desired thickness, of course, depends upon the density of the material employed to form the film as well as upon other considerations as will appear from the above description. It has been found that a thickness of 1,000 angstroms of a film of polyvinyl formal gives very satisfactory results. This thickness of film gives satisfactory image resolution with a magnification of at least 100 diameters and also permits the passage therethrough of some unscattered electrons along the electron optical axis thereby facilitating the identification of the position of the specimen as hereinbefore described.

While the invention has been described by reference to particular embodiments, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. The method of obtaining a magnified shadow image of a specimen in electron diffraction apparatus comprising the steps of generating a beam of electrons, accelerating the beam of electrons along an electron optical axis, placing a thin electron permeable film in a position to traverse the axis, focusing the electrons upon the film whereby a divergent beam of electrons is formed beyond the film, and placing a specimen within the divergent beam whereby a magnified shadow image of the specimen is formed beyond the specimen.

2. The method of obtaining a magnified shadow image of a specimen in electron diffraction apparatus comprising the steps of generating a beam of electrons, accelerating the beam of electrons along a linear electron optical axis, focusing the electrons by means of an electron lens to form a substantially point source on the axis, scattering the electrons in a divergent beam by positioning a thin electron permeable film to traverse the point source, and positioning a specimen within the divergent beam whereby a magnified shadow image of the specimen may be formed.

3. The method of obtaining a magnified shadow image of a specimen in electron diffraction apparatus comprising the steps of generating a beam of electrons, accelerating said beam of electrons along a linear electron optical axis, focusing said electrons by means of an electron lens to form a substantially point source on said axis, scattering said electrons in a divergent beam by positioning a thin electron permeable film adjacent said point source, and positioning a specimen within said divergent beam whereby a magnified shadow image of said specimen may be formed.

4. The method of obtaining a magnified shadow image in electron diffraction apparatus wherein an electron beam is focused upon an image forming means to obtain a diffraction pattern of a specimen, said method comprising positioning a specimen in the path of the electron beam and focusing the electron beam adjacent a thin electron permeable film located between the specimen and the source of the electron beam to scatter the electrons in a divergent beam whereby the shadow image of the specimen may be obtained.

5. The method of obtaining a magnified shadow image in electron diffraction apparatus whereby an electron beam is focused upon an image forming means to obtain a diffraction pattern of a specimen, said method comprising positioning a specimen in the path of the electron beam and focusing the electron beam upon a thin electron permeable film located between the specimen and the source of the electron beam to scatter the electrons in a divergent beam whereby the shadow image of the specimen may be obtained.

6. The method of obtaining a diffraction pattern of a selected portion of a specimen in electron diffraction apparatus wherein an electron beam is focused by an electron lens upon an image forming means to obtain a diffraction pattern of a specimen positioned between said lens and said image forming means, said method comprising inserting a thin electron permeable film between the lens and the specimen, focusing the electron beam upon the film whereby a divergent beam of electrons will be created and a shadow image of the specimen formed on the image forming means, removing the film from between the lens and the specimen, and focusing the electron beam upon the image-forming means.

7. The method of obtaining a diffraction pattern of a selected portion of a specimen comprising the steps of generating a beam of electrons, accelerating said beam along an electron optical axis, placing a thin electron permeable film in a position to traverse said axis, focusing said beam of electrons adjacent said film to form a scattered divergent beam of electrons having a central unscattered portion beyond said film, placing a specimen within said beam beyond said film whereby a magnified shadow image of said specimen having a central relatively more intensely illuminated area is formed beyond said specimen, scanning said specimen to select a portion suitable for diffraction study, gradually refocusing said beam toward said shadow image and moving said specimen to retain a selected portion identified by said more intensely illuminated area within said beam, and removing said electron permeable film when said beam is focused near said shadow image whereby a diffraction pattern of a selected portion of said specimen may be obtained.

8. The method of obtaining a diffraction pattern of a selected portion of a specimen comprising the steps of generating a beam of electrons, accelerating said beam along an electron optical axis, placing a thin electron permeable film in a position to traverse said axis, focusing said beam of electrons upon said film to form a scattered divergent beam of electrons having a central unscattered portion beyond said film, placing a specimen within said beam beyond said film whereby a magnified shadow image of said specimen having a central relatively more intensely illuminated area is formed beyond said specimen, scanning said specimen to select a portion suitable for diffraction study, gradually refocusing said beam toward said shadow image and moving said specimen to retain a selected portion identified by said more intensely illuminated area within said beam, and removing said electron permeable film when said beam is focused near said shadow image whereby a diffraction pattern of a selected portion of said specimen may be obtained.

9. The method of obtaining a diffraction pattern of a desired portion of a specimen in electron diffraction apparatus wherein an electron beam is accelerated by a unidirectional voltage and focused by an electron lens upon an image forming means to obtain a diffraction pattern of a specimen positioned between said lens and said image forming means, said method comprising inserting a thin electron permeable film between said lens and said specimen, adjusting said accelerating unidirectional voltage and said electron lens to focus said electron beam upon said film such that a divergent beam of electrons having a central unscattered portion will be created and a shadow image of an identified section of said specimen formed upon said image forming means, selecting said desired portion of said specimen, removing said film from between said lens and said specimen, and adjusting said accelerating unidirectional voltage and said electron lens to focus said electron beam upon said image-forming means.

10. The method of obtaining a diffraction pattern of a selected portion of a specimen in electron diffraction apparatus wherein an electron beam is accelerated by a unidirectional voltage and focused by an electron lens upon an image forming means to obtain a diffraction pattern of a specimen positioned between said lens and said image forming means, said method comprising inserting a thin electron permeable film between said lens and said specimen, focusing said electron beam adjacent said film to form a shadow image of said specimen upon said image forming means, said shadow image having a central relatively more intensely illuminated area, scanning said specimen to select a portion suitable for diffraction study, gradually refocusing said beam toward said shadow image and moving said specimen to retain within said beam a selected portion identified by said more intensely illuminated shadow image area, and removing said electron permeable film when said beam is focused near said shadow image whereby a diffraction pattern of a selected portion of said specimen may be obtained.

11. Unitary apparatus for obtaining diffraction patterns and shadow images of a specimen comprising an envelope capable of being evacuated, a source of electrons within said envelope, means for accelerating said electrons in a beam along an electron optical axis within said envelope, means for inserting a specimen within said beam at a desired position along said axis, image forming means spaced from said specimen inserting means and traversing said axis on the side opposite said electron source, a thin electron permeable film spaced from said specimen inserting means along said axis on the same side as said electron source and adjustably mounted for positioning to traverse said beam when desired, and an electron lens having a variable focal length and being positioned along said axis between said source and said film, said lens being adaptable for focusing said beam upon said image forming means to obtain a diffraction pattern of a specimen inserted with said specimen inserting means when said film is not traversing said beam and also being adaptable for focusing said beam upon said film when said film is positioned to traverse said beam to obtain a shadow image of a specimen inserted with said specimen inserting means.

12. Unitary apparatus for obtaining diffraction patterns and shadow images of a specimen comprising an envelope capable of being evacuated, a source of electrons within said envelope, means for accelerating said electrons in a beam along an electron optical axis within said envelope, a specimen holding means for inserting a specimen within said beam at a desired position along said axis, image forming means spaced from said specimen holding means and traversing said axis on the side opposite said electron source, a thin electron permeable film spaced from said specimen holding means and adjustably mounted to permit said film to be positioned within or without said beam, and an electron lens having a variable focal length and being positioned along said axis between said source and said film, the variable focal length of said lens permitting the focusing of said beam upon said image forming means to obtain a diffraction pattern of a specimen inserted with said specimen holding means when said film is positioned without said beam and also permitting the focusing of said beam upon said film when said film is positioned within said beam to obtain a shadow image of a specimen inserted with said specimen holding means.

13. An attachment for electron diffraction apparatus wherein means are provided for irradiating a specimen with an electron beam within an evacuated envelope, said attachment comprising the combination of a thin electron permeable film and a holder for said film adapted to be attached to the evacuated envelope of the diffraction apparatus to support said film therewithin, said holder including means for moving said film into and out of the electron beam from the exterior of the evacuated envelope.

14. An attachment for electron diffraction apparatus wherein means are provided for irradiating a specimen with an electron beam within an evacuated envelope, said attachment comprising the combination of a thin electron permeable film and a holder for said film adapted to be attached to the evacuated envelope of the diffraction apparatus to support said film therewithin and adjacent the specimen, said holder including means adapted for moving said film into and out of the electron beam from the exterior of the evacuated envelope.

MAYNARD J. COLUMBE.

REFERENCES CITED

The following references are of record in the file of this patent:

UNITED STATES PATENTS

| Number | Name | Date |
|---|---|---|
| 2,443,021 | Bensen | June 8, 1948 |
| 2,457,092 | Simard | Dec. 21, 1948 |
| 2,498,479 | Bensen | Feb. 21, 1950 |